United States Patent
Kunisada et al.

(10) Patent No.: US 9,568,073 B2
(45) Date of Patent: Feb. 14, 2017

(54) BELT ATTACHMENT JIG

(75) Inventors: Takashi Kunisada, Hyogo (JP); Takemasa Yoshimi, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 734 days.

(21) Appl. No.: 13/703,878

(22) PCT Filed: Jun. 15, 2011

(86) PCT No.: PCT/JP2011/003419
§ 371 (c)(1),
(2), (4) Date: Dec. 12, 2012

(87) PCT Pub. No.: WO2011/158505
PCT Pub. Date: Dec. 22, 2011

(65) Prior Publication Data
US 2013/0081241 A1    Apr. 4, 2013

(30) Foreign Application Priority Data

Jun. 17, 2010  (JP) .................................. 2010-138627
Feb. 1, 2011  (JP) .................................. 2011-020060

(51) Int. Cl.
*B23P 19/02*    (2006.01)
*F16H 7/24*    (2006.01)

(52) U.S. Cl.
CPC ............ *F16H 7/24* (2013.01); *Y10T 29/53657* (2015.01)

(58) Field of Classification Search
CPC ........... B23Q 1/015; B23Q 3/104; F16H 7/24; F16H 7/08; F16H 7/20; Y10T 29/53974; Y10T 29/53657

USPC ............ 29/235, 244–282; 474/130, 119–122
See application file for complete search history.

(56) References Cited

U.S. PATENT DOCUMENTS 319,803 A  *  6/1885  Eagleston .................... 474/130
2008/0155803 A1*  7/2008  Iwata ........................... 29/281.4

FOREIGN PATENT DOCUMENTS

| JP | 2003-322230 A | 11/2003 |
| JP | 2007-120678 A | 5/2007 |
| JP | 2009-115150 A | 5/2009 |
| JP | 4361961 | 8/2009 |
| JP | 2010-078058 A | 4/2010 |
| WO | 20051012766 A1 | 2/2005 |

OTHER PUBLICATIONS

International Search Report; PCT/JP2011/003419: Aug. 23, 2011.

\* cited by examiner

*Primary Examiner* — Monica Carter
*Assistant Examiner* — Nirvana Deonauth
(74) *Attorney, Agent, or Firm* — Studebaker & Brackett PC

(57) ABSTRACT

A belt attachment jig includes a jig body (10) located along a side surface of a pulley (1), and a belt guide portion (15) which protrudes forward in the pulley rotational direction from a contact portion (11) near one end of the jig body (10). The belt (B) is held between the twisting preventing plate (12) which forms the other end of the jig body (10) and the side surface of the jig-attached pulley (1) such that an inner circumferential surface of the belt (B) faces the jig-attached pulley (1). As the pulley (1) is rotated, the belt attachment jig is moved in the pulley rotational direction together with the belt (B) in a manner that makes the belt (B) fitted in the pulley groove.

12 Claims, 13 Drawing Sheets

(a)

(b)

BELT ATTACHMENT JIG

TECHNICAL FIELD

The present disclosure relates to belt attachment jigs, specifically relates to belt attachment jigs which prevent damage of a back surface of a belt when the belt is wrapped around a pulley having a pulley groove in its outer circumferential surface by rotating the pulley.

BACKGROUND ART

In general, belt drive systems in which a belt is wrapped around a plurality of pulleys each having a pulley groove on its outer circumferential surface include a tension applying means, such as an auto tensioner, which applies predetermined belt tension after the belt is looped over all of the pulleys.

To avoid the provision of such a tension applying means, there is a belt which, when being attached to a plurality of pulleys, is extended in a circumferential direction and made to pass over the flange of the pulley, and a belt attachment jig for attaching the belt to the pulley has been suggested.

In the case for example where a belt is wrapped around two pulleys, the belt attachment jig is used in such a manner that the belt is looped over one of the two pulleys (a first pulley), and in this state, the belt is wound around the belt attachment jig and the belt attachment jig is attached to a second pulley. In this attachment state, the belt is wound around the belt attachment jig, and a belt portion located on the rear side of the belt attachment jig in the pulley rotational direction is fitted in the pulley groove of the second pulley, and a belt portion located on the forward side of the belt attachment jig in the pulley rotational direction is pulled laterally toward a near side of the second pulley. Accordingly, the belt attachment jig is sandwiched between the belt and the pulley groove. The phrase "near side" as used in this specification refers to the side closer to an operator who is attaching the belt, and the phrase "back side" refers to the side opposite to the side closer to the operator.

The belt attachment jig in this attachment state is moved forward in the pulley rotational direction by rotating the center bolt of the jig-attached pulley with a wrench, etc., to gradually increase the area of the belt which is fitted in the pulley groove, and make the belt completely wrapped around the jig-attached pulley in the end.

When the belt is wrapped around the pulleys as described above, the belt wound around the belt attachment jig passes through a lateral side of the near side of the jig-attached pulley and is led to the first pulley. Thus, if the belt is wrapped around the pulleys by rotating the second pulley, the belt entering to the first pulley may be pulled hard laterally toward the near side of the first pulley due to the tension generated by the wrapping of the belt. This may result in the detachment of the belt from the first pulley. To avoid the detachment of the belt, belt detachment preventing jigs for preventing the detachment of the belt have been known.

For example, Patent Document 1 discloses a belt detachment preventing jig including a plate-like detachment preventing member located on the rim of a pulley flange, and a fixing portion comprised of an engagement groove formed in the bottom of the detachment preventing member and a sandwiching portion which protrudes from the bottom of the detachment preventing member so as to extend along the inner surface of a pulley groove, wherein the pulley flange is sandwiched in the engagement groove, and the sandwiching portion is sandwiched between the belt and the pulley groove. Therefore, even if the belt is pulled laterally toward the near side of the pulley, the detachment preventing member prevents the detachment of the belt from the pulley.

CITATION LIST

Patent Document

Patent Document 1: Japanese Patent No. 4361961

SUMMARY OF THE INVENTION

Technical Problem

However, although the belt detachment preventing jig of Patent Document 1 can prevent the belt from being detached from the pulley, the belt is pulled hard toward an operator laterally from the pulley. The belt tension is maximum particularly near the end of the wrapping of the belt around the pulley. Therefore, the tensile strength in a lateral direction toward the near side the pulley is increased as well. As a result, the belt can easily override the detachment preventing member. If this happens, a belt portion located near the forward side of the belt attachment jig in the pulley rotational direction may be twisted, and the back surface of the twisted portion comes in contact with the near side surface of the jig-attached pulley. As a result, the back surface of the belt may be damaged during the attachment of the belt to the pulley.

Further, even if the belt does not override the detachment preventing member, a belt portion which is not yet wrapped around the pulley groove is free and is in contact with the near side surface of the pulley. Thus, the belt may be twisted as it slides on the near side surface of the jig-attached pulley during the rotation of the jig-attached pulley, and the back surface of the twisted portion of the belt may come in contact with the pulley and be damaged.

The present disclosure was made in view of the above problem, and it is an objective of the invention to prevent a belt looped over a pulley from being detached from the pulley, and prevent a back surface of the belt from being damaged, when wrapping the belt around at least two pulleys.

Solution to the Problem

To achieve the above objective, a belt attachment jig of the present disclosure has an improved structure in which a belt portion on the near side of the pulley is firmly engaged with a pulley groove of a pulley over which the belt is looped beforehand, and in which the belt is prevented from being twisted.

Specifically, the present disclosure is directed to a belt attachment jig which is used for wrapping a belt around at least two pulleys, each having a pulley groove, in a tight tension by being attached to one of the pulleys to have the belt fitted to the pulley groove of the one pulley, with the belt looped over the other pulley, and the belt attachment jig includes the following solutions.

That is, the first aspect of the present disclosure includes a jig body located along a side surface of the pulley such that one end of the jig body is located at a forward position of a second end of the jig body in a pulley rotational direction; and a belt guide portion which is provided at the second end of the jig body and protrudes forward in the pulley rotational direction to be fitted to the pulley groove of the pulley, and which is separated from the one end of the jig body in a direction along a rotational axis of the pulley with a space between the belt guide portion and the one end of the jig body, for guiding the belt into the space through a top surface of a base end of the belt guide portion, wherein the belt guided into the space is held between the one end of the jig body and the side surface of the jig-attached pulley such that an inner circumferential surface of the belt faces the jig-attached pulley, and in this state, the belt attachment jig is moved in the pulley rotational direction together with the belt as the pulley is rotated, to fit the belt to the pulley groove.

The second aspect of the present disclosure is that, in the belt attachment jig of the first aspect of the present disclosure, in the state where the belt is held, the jig body is located near a rim of the jig-attached pulley at a position close to a forward end of the belt guide portion.

The third aspect of the present disclosure is that, in the belt attachment jig of any one of the first and second aspects of the present disclosure, the belt guide portion includes a first tilted surface tilting downward to the space at an edge surface closer to the space.

The fourth aspect of the present disclosure is that, in the belt attachment jig of any one of the first to third aspects of the present disclosure, the belt guide portion includes a second tilted surface tilting downward away from the space at an edge surface opposite to the edge surface closer to the space.

The fifth aspect of the present disclosure is that, in the belt attachment jig of any one of the first to fourth aspects of the present disclosure, the space between the one end of the jig body and the belt guide portion in the direction along the rotational axis of the pulley is wider from a rear side to a forward side in a pulley rotational direction.

The sixth aspect of the present disclosure is that, in the belt attachment jig of any one of the first to fifth aspects of the present disclosure, the pulley groove of each of the pulleys includes a plurality of pulley grooves arranged in parallel with each other, and each of the pulley grooves is in a V shape having a decreasing width from an open end to a bottom end, and the belt guide portion has, on a back surface thereof, a plurality of engagement protrusions which engage with the pulley grooves, and each of the engagement protrusions has a triangular or trapezoidal cross section to correspond to each of the pulley grooves.

The seventh aspect of the present disclosure is that, in the belt attachment jig of any one of the first to sixth aspects of the present disclosure, the jig-attached pulley is a pulley with a flange, and the flange of the jig-attached pulley has a trapezoidal cross section with a decreasing width from a base end to a top end, and an engagement groove which sandwiches and engages with the flange of the jig-attached pulley is formed between the second end of the jig body and the back surface of the base end of the belt guide portion.

The eighth aspect of the present disclosure is that the belt attachment jig of any one of the first to seventh aspects of the present disclosure further includes a belt pushing portion which protrudes from the second end of the jig body so as to be outwardly apart from the belt guide portion in a radial direction of the pulley, overlaps with the one end of the jig body with a gap between the one end of the jig body and the belt pushing portion in the radial direction of the pulley, and is separated from the belt guide portion in the direction along the rotational axis of the pulley with a space between the belt pushing portion and the belt guide portion, and in which, prior to an end of wrapping of the belt, an end portion of the belt pushing portion close to the space comes in contact with a portion of the belt which is not yet fitted in the pulley groove, and pushes the portion of the belt toward the jig-attached pulley.

The ninth aspects of the present disclosure is that, in the belt attachment jig of the eighth aspect of the present disclosure, the belt pushing portion curves along the rim of the jig-attached pulley.

The tenth aspect of the present disclosure is that, in the belt attachment jig of any one of the first to ninth aspects of the present disclosure, the jig body is configured to be capable of holding, when the belt attachment jig is attached to the pulley, a portion of the belt which extends radially outward from near a center portion of the pulley at a belt-separating side of the pulley by sandwiching the belt between the jig body and the side surface of the pulley, with the inner circumferential surface of the belt facing the jig-attached pulley.

The eleventh aspect of the present disclosure is that, in the belt attachment jig of the tenth aspect of the present disclosure, the jig body extends along the side surface of the jig-attached pulley, and has a shape of an arc following the rim of the pulley.

The twelfth aspect of the present disclosure is that, in the belt attachment jig of any one of the first to eleventh aspects of the present disclosure, the jig body further includes a belt sandwiching portion which is apart from the belt guide portion in the direction along the rotational axis of the pulley, with a space between the belt sandwiching portion and the belt guide portion, and sandwiches the belt that has passed through the space between the belt sandwiching portion and the belt guide portion.

Advantages of the Invention

According to the first aspect of the present disclosure, the belt guided into the space between one end portion of the jig body and the belt guide portion is held in a predetermined position by the one end portion of the jig body and a side surface of the jig-attached pulley, with an inner circumferential surface of the belt facing toward the pulley. Thus, a portion of the belt which is not yet wrapped around the pulley groove is in a state in which one side of the belt in its width direction that is to be delivered to the near side of the outer circumferential surface of the pulley is closer to the rotational axis of the pulley than the other side of the belt in its width direction that is to be delivered to the back side of the outer circumferential surface of the pulley. Therefore, a portion of the belt located on the other pulley, to which the belt is delivered from the jig-attached pulley, at a portion closer to the near side of the other pulley firmly engages with the pulley groove of the other pulley, thereby making it possible to prevent the belt from being detached from the other pulley. The belt is also prevented from being twisted with reliability on a side surface of the jig-attached pulley where the belt slides during the rotation of the jig-attached pulley, and thus prevented from being damaged on the belt back surface. That is, it is possible to prevent the belt from being detached from the pulley over which the belt is looped beforehand, and possible to prevent the belt from being damaged on the belt back surface. Accordingly, the above-mentioned belt detachment preventing jigs are not necessary, and thus, it is possible to reduce the number of jigs necessary for attaching the belt to the pulley, and possible to favorably attach the belt to the pulley using the belt attachment jig which is simple in structure and compact in size.

According to the second aspect of the present disclosure, the belt can be held in a predetermined position by the jig body and the side surface of the jig-attached pulley even in a situation where the belt portion which is not yet wrapped around the pulley groove is located near the rim of the jig-attached pulley near the end of the wrapping of the belt around the pulley. Therefore, it is possible to favorably prevent the belt from being detached from the pulley over which the belt is looped beforehand, and prevent damage of the belt on the belt back surface, until the end of wrapping of the belt.

According to the third aspect of the present disclosure, the first tilted surface tilting downward to the space allows the belt to be bent at the surface of the belt guide portion, inserted in the space between the one end portion of the jig body and the belt guide portion, and pulled toward the side of the pulley without causing significant bending of the belt, when the belt is made to pass through the top surface of the base end of the belt guide portion and guided into the space to be wound around the belt attachment jig. Accordingly, it is possible to prevent a concentration of strain of the belt during the belt attachment to the pulley, and prevent damage of the belt.

According to the fourth aspect of the present disclosure, when the belt comes off the space between the one end portion of the jig body and the belt guide portion, and rides on the surface of the belt guide portion in the end of the belt wrapping around the pulley, the second tilted surface of the belt guide portion allows the belt to be smoothly fitted to the pulley groove by slipping onto the pulley groove. Accordingly, it is possible to smoothly attach the belt to the pulley.

According to the fifth aspect of the present disclosure, the space between the one end portion of the jig body and the belt guide portion is wider in the forward direction of the pulley rotation. Thus, it is easy to insert the belt in the space, which can enhance usability of the belt attachment jig.

According to the sixth aspect of the present disclosure, the belt attachment jig is attached to the pulley by the wedge engagement between the engagement protrusions on the back surface of the belt guide portion and the pulley groove of the jig-attached pulley. Thus, it is possible to prevent the belt attachment jig from being disengaged with the pulley and falling off the pulley after the belt wrapping around the pulley.

According to the seventh aspect of the present disclosure, the belt attachment jig is attached to the pulley by the wedge engagement between the engagement groove of the belt attachment jig and the flange of the jig-attached pulley. Thus, it is possible to prevent the belt attachment jig from being disengaged with the pulley and falling off the pulley after the belt wrapping around the pulley.

According to the eighth aspect of the present disclosure, even when the belt moves out of the space between the jig body and the side surface of the jig-attached pulley right before the end of the belt wrapping at which the belt tension is maximum, and a portion of the belt close to the near side of the pulley is no longer firmly fitted to the pulley groove of the pulley to which the belt is delivered from the jig-attached pulley, a portion of the belt which is not yet fitted to the pulley groove is pushed toward the jig-attached pulley by the belt pushing portion prior to the end of the belt wrapping. Accordingly, it is possible to reliably prevent the belt from being detached from the pulley to which the belt is delivered from the jig-attached pulley, and prevent the belt from riding on the flange in the case where the pulley is a flange pulley.

According to the ninth aspect of the present disclosure, the belt pushing portion curves along the rim of the jig-attached pulley. Thus, when the belt moves out of the space between the jig body and the side surface of the jig-attached pulley, the portion of the belt which is not yet wrapped around the pulley groove can be pushed toward the jig-attached pulley by the compact structure.

A portion of the belt which extends radially outward from near a center portion of the pulley at a belt-separating side of the jig-attached pulley is easily twisted by sliding on the side surface of the jig-attached pulley during the rotation of the jig-attached pulley, However, according to the tenth aspect of the present disclosure, the belt is maintained in a position in which the inner circumferential surface of the belt is made to face the jig-attached pulley by the jig body and the side surface of the jig-attached pulley since after the belt attachment jig is initially attached to the pulley. Accordingly, it is possible to more reliably prevent the belt B from being twisted.

According to the eleventh aspect of the present disclosure, the jig body has a shape of an arc following the rim of the jig-attached pulley. Thus, a relatively longer portion of the belt on the side of the jig-attached pulley can be held between the jig body and the side surface of the jig-attached pulley, thereby enabling the belt to be in a predetermined stable position.

According to the twelfth aspect of the present disclosure, when the belt is wrapped around the pulley, the belt is sandwiched between the belt sandwiching portion and the belt guide portion, and the belt is fixed to the belt attachment jig itself. With this structure, it is possible to prevent the belt from slipping on the belt attachment jig during the rotation of the pulley, thereby making it possible to attach the belt to the pulley efficiently and reliably.

DESCRIPTION OF EMBODIMENTS

Embodiments of the present disclosure will be described in detail below based on the drawings. The present disclosure is not limited to the embodiments below.

First Embodiment of Invention

Figure 1:
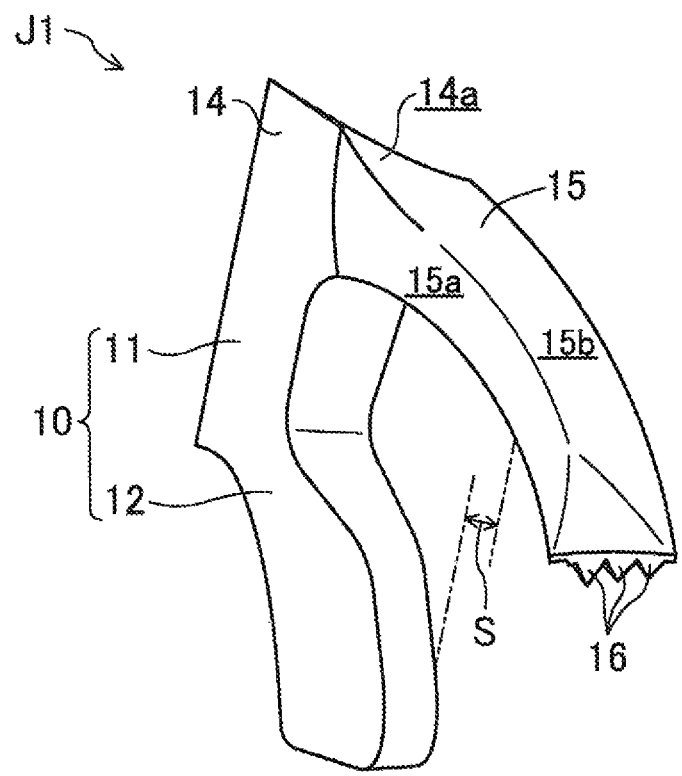
FIG. 1 is an oblique view of a belt attachment jig of the first embodiment.
Figure 2:
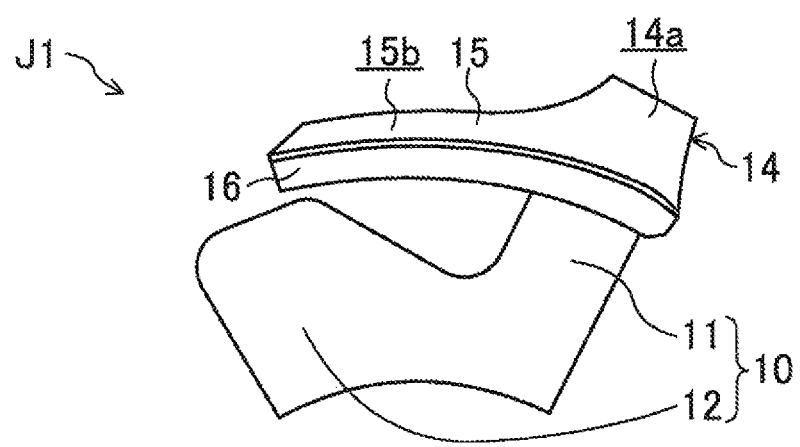
FIG. 2 is a side view of the belt attachment jig of the first embodiment.
Figure 3:
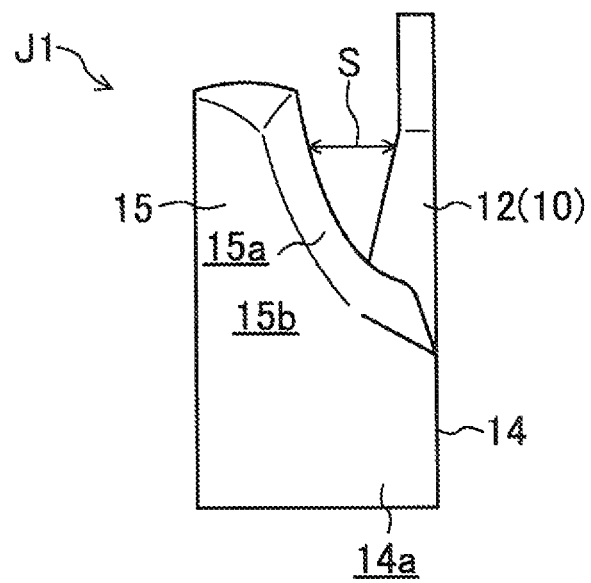
FIG. 3 is a plan view of the belt attachment jig of the first embodiment.
Figure 4:
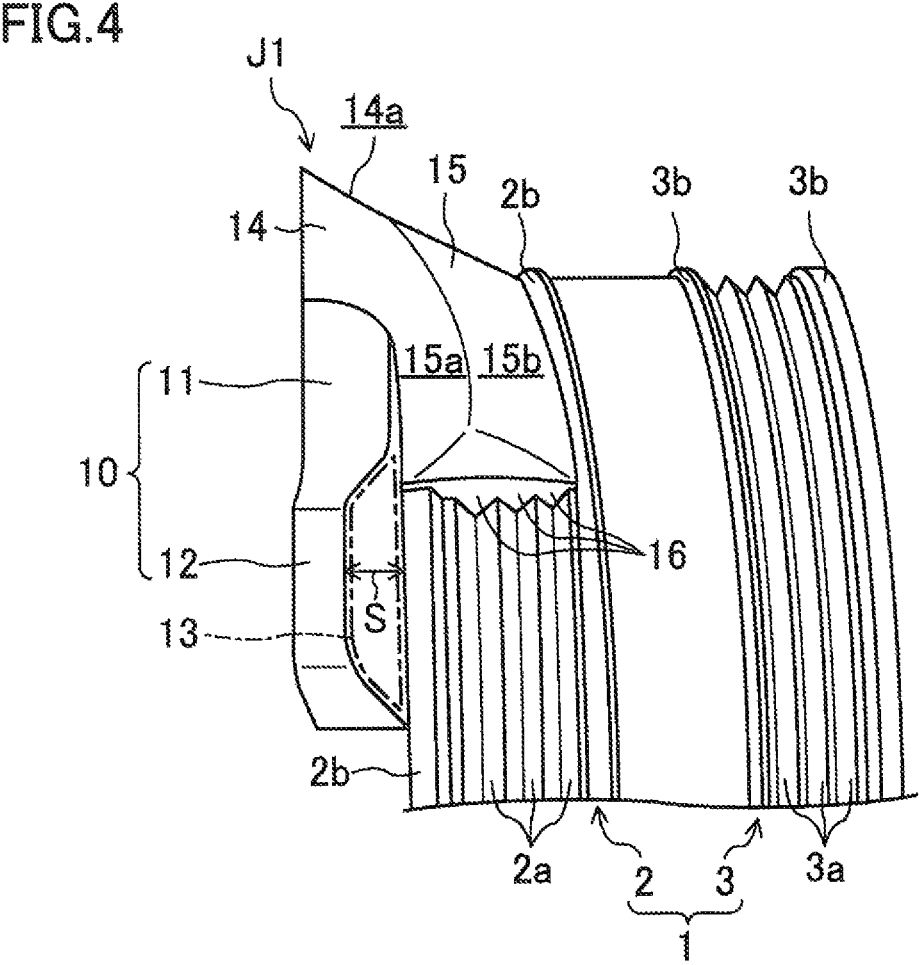
FIG. 4 is a front view showing a relationship between the belt attachment jig of the first embodiment and a pulley to which the belt attachment jig is attached.
Figure 5:
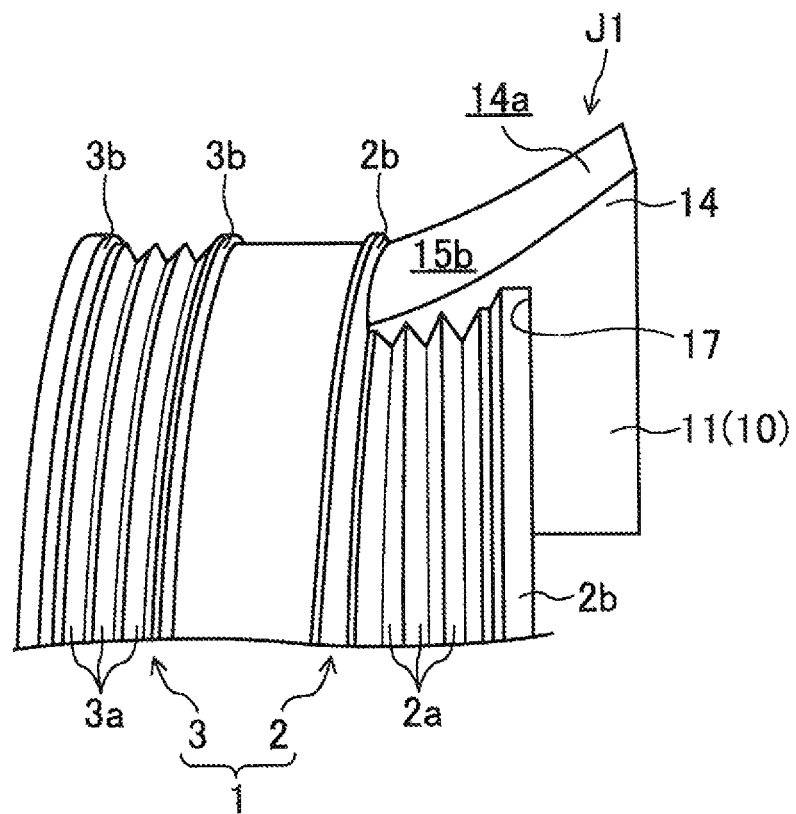
FIG. 5 is a back view showing a relationship between the belt attachment jig of the first embodiment and the pulley to which the belt attachment jig is attached.
Figure 6:
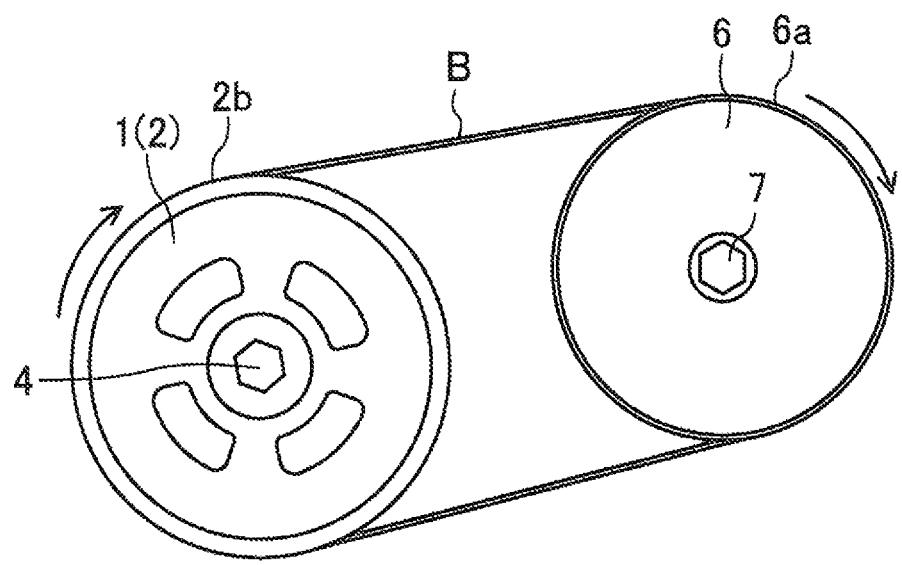
FIG. 6 is a side view showing a crank pulley and a compressor pulley around which a belt is wrapped.

FIG. 1 to FIG. 5 show a belt attachment jig J1 of the first embodiment. FIG. 1 is an oblique view of the belt attachment jig J1. FIG. 2 is a side view of the belt attachment jig J1. FIG. 3 is a plan view of the belt attachment jig J1. FIG. 4 is a front view of the belt attachment jig J1. FIG. 5 is a back view of the belt attachment jig J1. Further, FIG. 6 is a side view of two pulleys 1, 6 around which a V-ribbed belt (hereinafter simply referred to as a "belt") B is wrapped using the belt attachment jig J1. FIG. 4 and FIG. 5 show a relationship between the belt attachment jig J1 and a pulley 1 to which the belt attachment jig J1 is attached.

As shown in FIG. 6, the belt attachment jig J1 of the present embodiment is used, for example, for wrapping the belt B around a crank pulley 1 coupled to a crank shaft of an engine body mounted on an engine, and a compressor pulley 6 coupled to an input axis of an air conditioner compressor also mounted on the engine.

The belt B includes a flat belt-like belt body in which a core wire made of a highly flexible fiber is buried, and a plurality of V-ribs (three V-ribs in the present embodiment) which are integrally formed in an inner circumferential surface of the belt body and protrude so as to extend in a circumferential direction of the belt. The crank pulley 1 and the compressor pulley 6 are rotatably supported, with a predetermined distance between the centers. The distance between the centers of the pulleys cannot be changed. The arrows in FIG. 6 respectively indicate the direction of rotation of the pulleys 1, 6. The engine does not have an auto tensioner (a tension applying means) which applies tension to the belt B.

The crank pulley 1 is a so-called double pulley with a flange, and includes a near-side pulley 2 and a back-side pulley 3 having a same diameter and arranged next to each other in a direction of the axis of the pulley as shown in FIG. 4 and FIG. 5. The back-side pulley 3 is sandwiched between the engine body and the near-side pulley 2. The near-side pulley 2 and the back-side pulley 3 are integrally formed, and each of the near-side pulley 2 and the back-side pulley 3 includes a plurality of pulley grooves 2a, 3a (three pulley grooves in the present embodiment) in the outer circumferential surface. The pulley grooves 2a, 3a are fitted to the V-ribs on the inner circumferential surface of the belt B, and extend parallel to one another in the circumferential direction. Each of the pulley grooves 2a, 3a is in a V shape having a decreasing width from an open end to a bottom end.

A pair of annular flanges 2b and a pair of annular flanges 3b are respectively provided on the outer circumferential surfaces of the near-side pulley 2 and the back-side pulley 3. The pair of flanges 2b, 3b are located at both ends of the group of the pulley grooves 2a, 3a in the direction along the rotational axis of the pulley so as to sandwich the group of the pulley grooves 2a, 3a. The near-side flange 2b of the near-side pulley 2 is configured such that the surface on the back side of the pulley inclines downward toward the pulley groove 2a to have a trapezoidal cross section with a decreasing width from the base end to the top end. Further, the crank shaft of the engine is inserted in a hub portion formed in the middle of the diameter of the crank pulley 1 from the back side of the pulley, and the end portion of the crank shaft is fixed at the near-side portion of the pulley with a center bolt 4.

As shown in FIG. 6, the compressor pulley 6 is also a flange pulley with annular flanges 6a located at both ends of the pulley in the direction along the rotational axis of the pulley. Although not shown, the compressor pulley 6 includes a plurality of V-shaped pulley grooves (three pulley grooves in the present embodiment) in the outer circumferential surface, which are fitted to the V-ribs on the inner circumferential surface of the belt B, similar to the crank pulley 1. The input axis of the air conditioner compressor is inserted in a hub portion of the compressor pulley 6 from the back side of the pulley, and the end portion of the input axis is fixed at the near-side portion of the pulley with a center bolt 7.

The belt attachment jig J1 is used in such a manner that one end of the belt B is looped over the compressor pulley 6, and in this state, the other end of the belt B is wound around the belt attachment jig J1, and the belt attachment jig J1 is attached to the crank pulley 1. The belt attachment jig J1 is an integrally-formed jig made of resin, such as mono cast (MC) nylon and polypropylene, and includes, as shown in FIG. 1 to FIG. 3, a jig body 10 located along a side surface of the crank pulley 1, and a belt guide portion 15 which protrudes forward in the pulley rotational direction from near the upper end portion of one end portion (left side in FIG. 1, right side in FIG. 2) of the jig body 10.

The one end portion of the jig body 10 forms a contact portion 11 which extends radially inward from the outer side of the pulley, and comes in contact with the near-side surface of the crank pulley 1. The other end portion of the jig body 10 forms a twisting preventing plate 12 which protrudes forward in the pulley rotational direction from a lower end portion of the contact portion 11. The jig body 10 is in an approximately L-shape, with the other end locating at a more forward position in the pulley rotational direction than the one end.

The twisting preventing plate 12 extends along the belt guide portion 15, and slightly protrudes forward from the belt guide portion 15 in the pulley rotational direction. As shown in FIG. 3 and FIG. 4, the twisting preventing plate 12 is apart from the belt guide portion 15 in the direction along the rotational axis of the pulley, with a space S between the preventing plate 12 and the belt guide portion 15. The forward end of the twisting preventing plate 12 is close to the belt guide portion 15 as shown in FIG. 2 so as to be close to the rim of the flange 2b of the crank pulley 1 when the belt attachment jig J1 is attached to the crank pulley 1.

A surface of the twisting preventing plate 12 which faces the crank pulley 1 is tilted from the rear side to the forward side in the pulley rotational direction, away from the belt guide portion 15. Thus, the space S between the twisting preventing plate 12 and the belt guide portion 15 in the direction along the rotational axis of the pulley increases from the rear side to the forward side in the pulley rotational direction as shown in FIG. 3 and FIG. 4. Since the space S between the twisting preventing plate 12 and the belt guide portion 15 is wider in the forward direction of the rotation, the belt attachment jig J1 includes a belt insertion space 13 which is wider from the rear side to the forward side in the pulley rotational direction between the near-side surface of the crank pulley 1 and the twisting preventing plate 12 when the belt attachment jig J1 is attached to the crank pulley 1, as shown in FIG. 4.

The belt guide portion 15 is configured to have a width approximately equal to the width of the near-side pulley 2 of the crank pulley 1, and guide the belt B into the space S between the belt guide portion 15 and the twisting preventing plate 12 through a top surface of a base end of the belt guide portion 15. The top surface of the belt guide portion 15 includes a first tilted surface 15a formed at the edge of the belt guide portion 15 closer to the space S and tilting downward to the space S, and a second tilted surface 15b formed on the other portion of the belt guide portion 15 and tilting downward away from the space S. Thus, the belt guide portion 15 has a gently uplifted surface.

Since the belt guide portion 15 includes the first tilted surface 15a, the belt B can be bent at the top surface of the belt guide portion 15, inserted in the space S between the twisting preventing plate 12 and belt guide portion 15, and pulled toward the side of the crank pulley 1 without causing significant bending of the belt B due to the first tilted surface 15a, when the belt B is made to pass through the top surface of the base end of the belt guide portion 15 and guided into the space S to be wound around the belt attachment jig J1. Accordingly, it is possible to prevent a concentration of strain of the belt B during the belt attachment to the pulley 1, and prevent damage of the belt B.

Further, since the belt guide portion 15 includes the second tilted surface 15b, the second tilted surface 15b allows the belt B to be smoothly fitted in the pulley groove 2a by slipping onto the pulley groove 2a when the belt B comes off the space S between the twisting preventing plate 12 and the belt guide portion 15 to ride on the belt guide portion 15 in the end of attachment of the belt B to the pulleys. Accordingly, it is possible to smoothly attach the belt B to the crank pulley 1.

The belt guide portion 15 has, on its back surface, a plurality of engagement protrusions 16 (three engagement protrusions in the present embodiment) which engage with the pulley grooves 2a of the near-side pulley 2. Each of the engagement protrusions 16 has an approximately triangular cross section corresponding to the pulley groove 2a, and is wedge engaged with the pulley groove 2a. In the present embodiment, each of the engagement protrusions 16 has an approximately triangular cross section. However, each of the engagement protrusions 16 may have a trapezoidal cross section so that the engagement protrusion 16 can be wedge engaged with the pulley groove 2a.

As shown in FIG. 5, an engagement groove 17 which sandwiches and engages with the near-side flange 2b of the crank pulley 1 is formed between the contact portion 11 of the jig body 10 and a back surface of the base end of the belt guide portion 15. The engagement groove 17 and the near-side flange 2b of the crank pulley 1 are wedge engaged with each other. This means that the belt attachment jig J1 is engaged with and fixed to the crank pulley 1 not only by the wedge engagement between the engagement protrusions 16 on the back surface of the belt guide portion 15 and the pulley grooves 2a, but also by the wedge engagement between the near-side flange 2b of the crank pulley 1 and the engagement groove 17. Thus, it is possible to prevent the belt attachment jig J1 from being disengaged with the crank pulley 1 and falling off the crank pulley 1 after the wrapping of the belt B around the crank pulley 1.

The end of the one end portion of the jig body 10 forms a belt holding portion 14 including a tilted surface 14a which is continuous with the first and second tilted surfaces 15a, 15b from the base end of the belt guide portion 15, and tilting upward and outward in the radial direction of the pulley toward the near-side of the pulley. When the belt attachment jig J1 around which the belt B is wound is attached to the crank pulley 1, and the pulley 1 is rotated to wrap the belt B around the pulley 1, the belt B is pulled toward the near side of the pulley due to the tension applied during the wrapping of the belt B. As a result, the inner circumferential surface of the belt B is pushed against the tilted surface 14a of the belt holding portion 14. The belt holding portion 14 holds the belt B due to the friction between the belt B and the belt holding portion 14, thereby preventing the belt B from coming off the belt attachment jig J1 to the near side of the pulley.

In the belt attachment jig J1 having the above structure, the belt B is looped over the compressor pulley 6. In this state, the belt B is made to pass through the back side of the belt holding portion 14 and run over the belt guide portion 15, and is inserted in the space S between the belt guide portion 15 and the twisting preventing plate 12, to be wound around the belt attachment jig J1. A portion of the belt B located on the rear side of the belt attachment jig J1 in the pulley rotational direction is fitted to the pulley groove 2a of the crank pulley 1. A portion of the belt B which passes through the space S is sandwiched between the twisting preventing plate 12 and the near-side surface of the crank pulley 1, and is held in the belt insertion space 13 such that the inner circumferential surface of the belt B faces the crank pulley 1. Then, the belt B is pulled to the near side of the crank pulley 1. Accordingly, the belt guide portion 15 is sandwiched between the pulley groove 2a of the crank pulley 1 and the belt B, and the belt attachment jig J1 is attached to the crank pulley 1.

The belt attachment jig J1 is attached to the crank pulley 1 in the state in which the belt B is held between the near-side surface of the crank pulley 1 and the twisting preventing plate 12 such that the inner circumferential surface of the belt B faces the crank pulley 1. In this attachment state, the belt attachment jig J1 moves along the rotational direction of the pulley together with the belt B as the crank pulley is rotated. In this manner, the belt B is fitted to the pulley groove 2a of the crank pulley 1.

—Method of Use—

Figure 7:
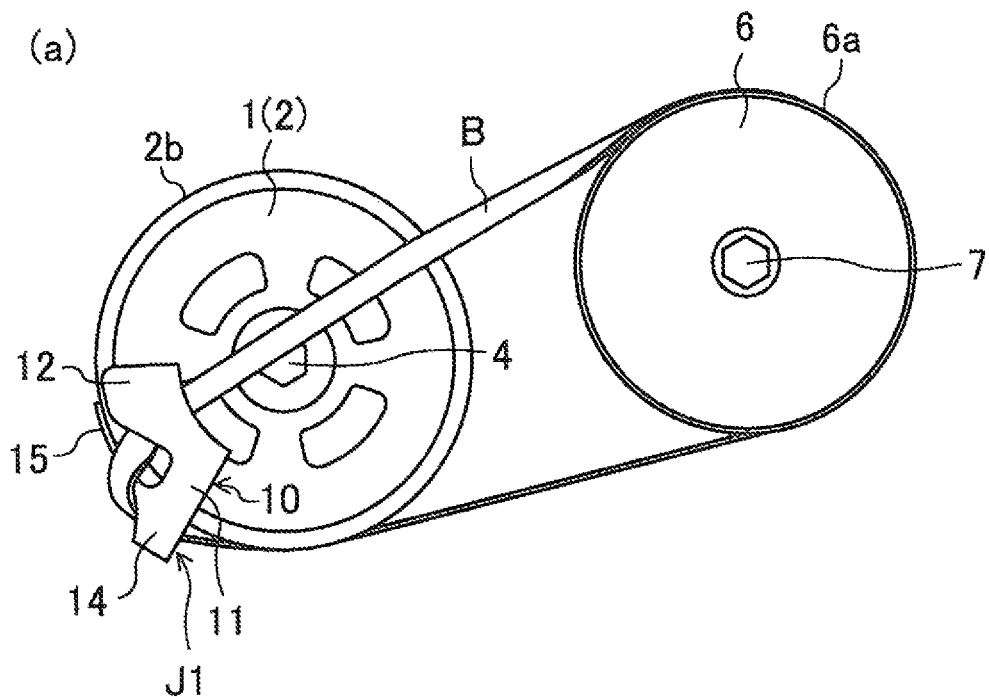
FIG. 7 is a side view showing a first half step of attaching the belt to the pulleys in the first embodiment.
Figure 7:
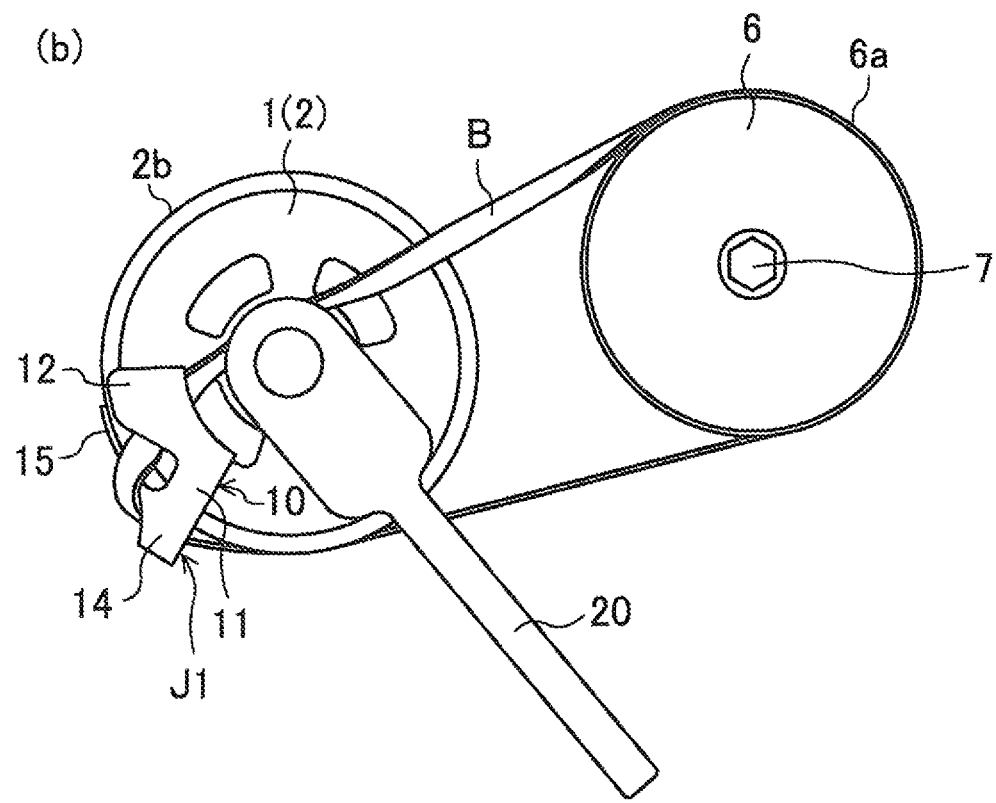
Figure 8:
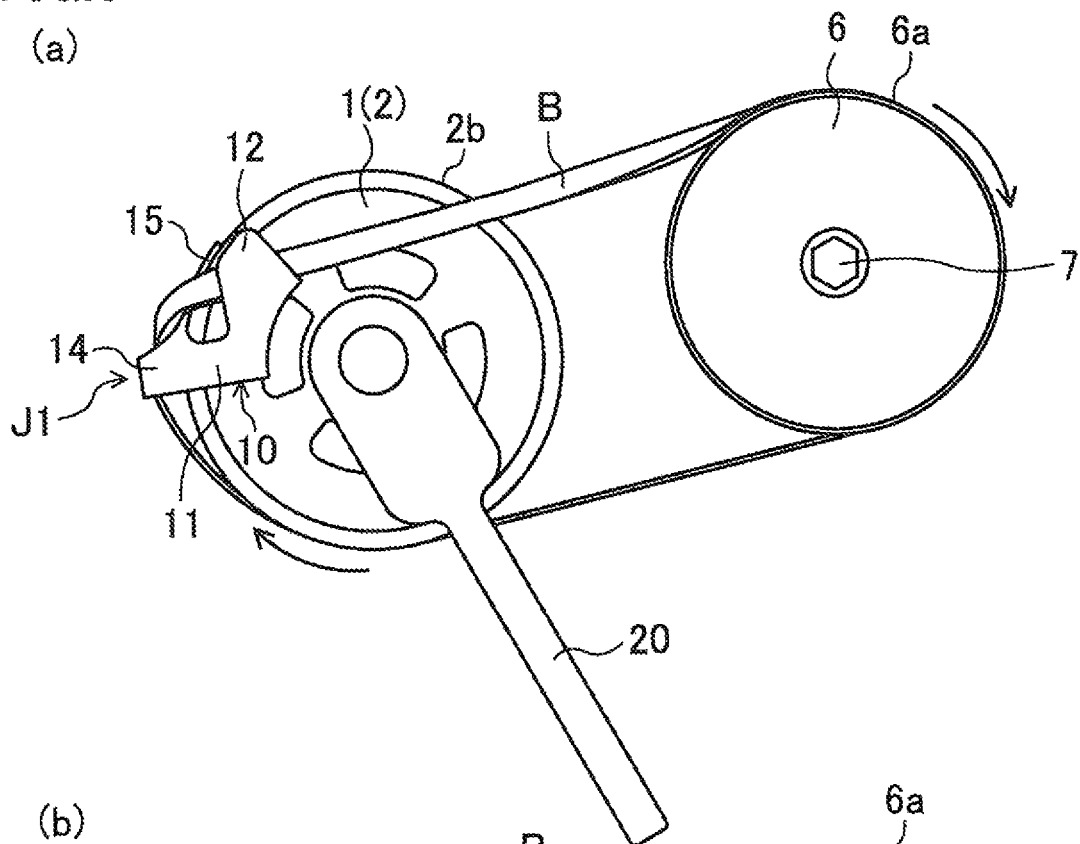
FIG. 8 is a side view showing a second half step of attaching the belt to the pulleys in the first embodiment.
Figure 8:
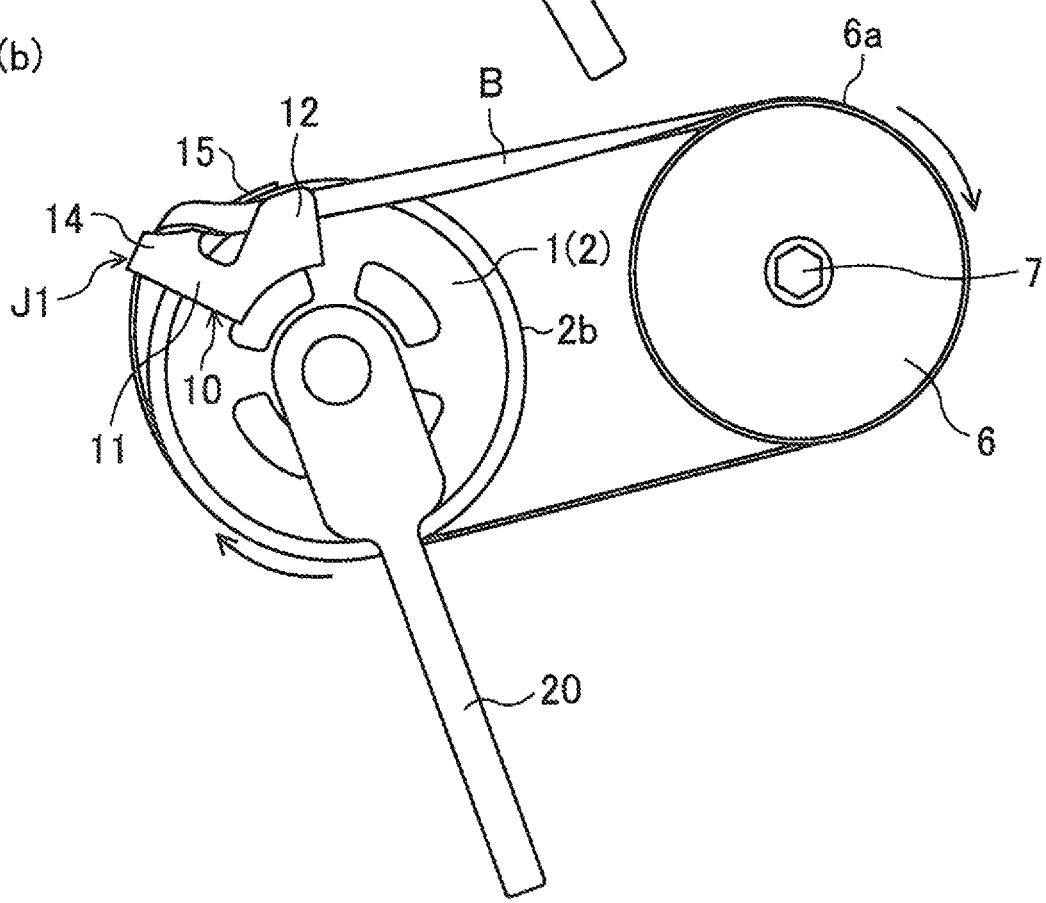
Figure 9:
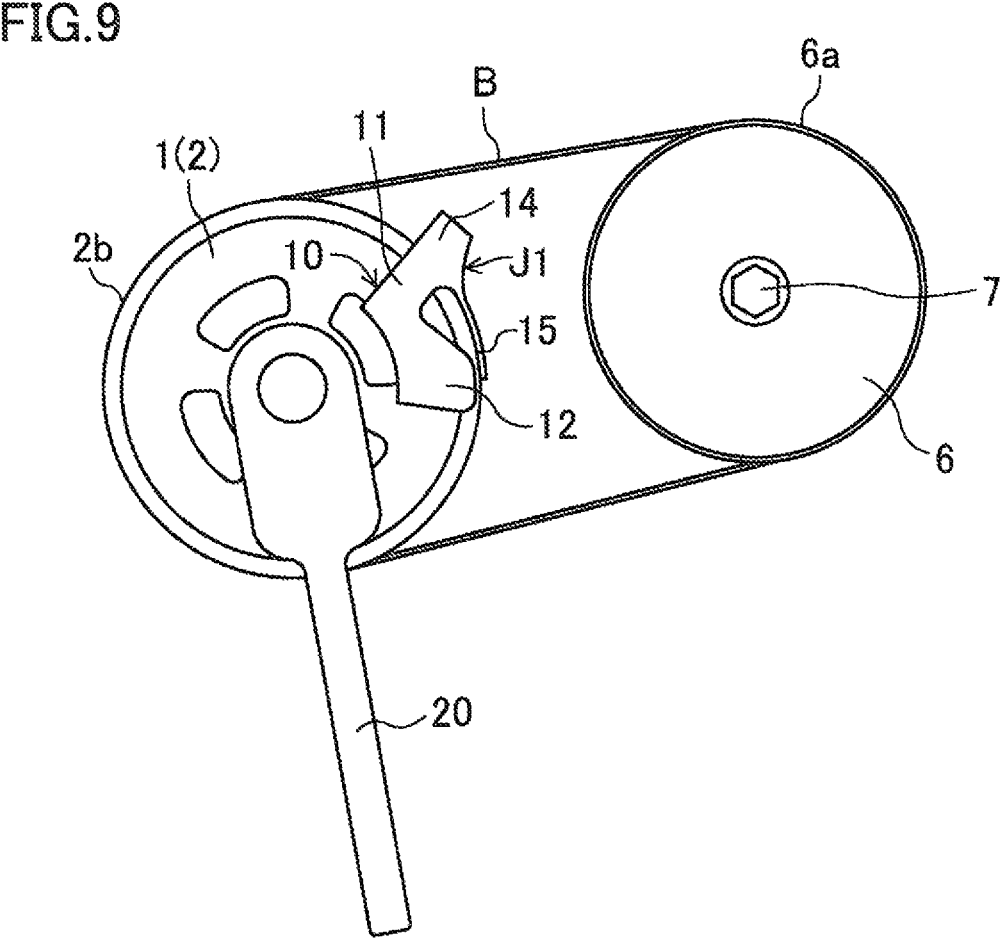
FIG. 9 is a side view showing a state in which the wrapping of the belt around the pulleys in the first embodiment is finished.

Next, how the belt B is attached to the crank pulley 1 and the compressor pulley 6 using the belt attachment jig J1 will be described with reference to FIG. 7 to FIG. 9. FIG. 7 is a side view showing a first half step of attaching the belt to the crank pulley 1. FIG. 8 is a side view showing a second half step of attaching the belt to the crank pulley 1. FIG. 9 is a side view showing a state in which the wrapping of the belt around the crank pulley 1 is finished. The arrows in FIG. 8 indicate the directions of rotation of the pulleys 1, 6.

To attach the belt B to the crank pulley 1 and the compressor pulley 6 using the belt attachment jig J1, the belt B is looped over the compressor pulley 6 first, and the belt B is made to pass through the back side of the belt holding portion 14 and run over the belt guide portion 15, and is inserted in the space S between the belt guide portion 15 and the twisting preventing plate 12, to be wound around the belt attachment jig J1, as shown in FIG. 7(a). It is easy to insert the belt B in the space S between the twisting preventing plate 12 and the belt guide portion 15 because the space S is wider in the forward direction of the pulley rotation. Next, a belt portion located on the rear side of the belt holding portion 14 in the pulley rotational direction is fitted to the pulley groove 2a, thereby wedge engaging the engagement protrusions 16 on the back surface of the belt guide portion 15 with the pulley grooves 2a of the near-side pulley 2 of the crank pulley 1, and wedge engaging the engagement groove 17 with the near-side flange 2b of the crank pulley 1.

The belt B inserted in the space S between the belt guide portion 15 and the twisting preventing plate 12 is sandwiched and held in the belt insertion space 13 between the near-side surface of the crank pulley 1 and the twisting preventing plate 12, such that the inner circumferential surface of the belt B faces the crank pulley 1, and the belt B is pulled forward in the pulley rotational direction with respect to the belt holding portion 14 and laterally toward the near side of the crank pulley 1. As a result, the belt guide portion 15 is sandwiched between the pulley groove 2a of the crank pulley 1 and the belt B, thereby attaching the belt attachment jig J1 to the crank pulley 1. In this state, the tension of the belt B is not that strong. Thus, the belt B can be easily wound around the crank pulley 1. Here, the belt B is fixed between the near-side surface of the crank pulley 1 and the twisting preventing plate 12. The belt guide portion 15 is sandwiched between this fixed belt B and the pulley groove 2a, and thus, the belt attachment jig J1 is firmly engaged with and fixed to the crank pulley 1 in relation to the attachment jig J1, the crank pulley 1, and the belt B.

Next, as shown in FIG. 7(b), a wrench 20 is connected to the center bolt 4 of the crank pulley 1 to which the belt attachment jig J1 is attached, so that the crank pulley 1 can be rotated by hand. If the belt B touches the connection portion at which the wrench 20 is connected to the center bolt 4, the back surface of the belt B is brought in contact with the connection portion.

Next, the crank pulley 1 is rotated clockwise as viewed in FIG. 7(b), using the wrench 20. As a result, as shown in FIG. 8(a), the belt attachment jig J1 moves forward in the pulley rotational direction, gradually increasing the area of the belt B which is fitted in the pulley groove 2a.

A force laterally toward the near side of the pulley is applied to the belt holding portion 14 from the belt B at this time. However, the belt guide portion 15 is pushed against the pulley groove 2a by the belt B, and the engagement groove 17 is wedge engaged with the near-side flange 2b of the crank pulley 1. Thus, the inclination of the belt attachment jig J1 is regulated, and the inner circumferential surface of the belt B is pushed onto the tilted surface 14a of the belt holding portion 14, which causes friction preventing the belt B from being detached from the belt attachment jig J1 laterally toward the near side of the pulley. Accordingly, the belt attachment jig J1 is attached to the crank pulley 1 until the end of the wrapping of the belt B around the crank pulley 1.

With the rotation of the crank pulley 1, a portion of the belt B which is located on the forward side of the belt attachment jig J1 in the pulley rotational direction and laterally toward the near side of the crank pulley 1, is moved radially outward from near a center portion of the crank pulley 1, and gradually approaches the rim of the near-side flange 2b of the crank pulley 1. The portion of the belt B is close to the rim of the pulley flange 2b near the end of the wrapping of the belt B around the crank pulley 1 as shown in FIG. 8(b). Even in this state, the position of the belt B can be maintained by the near-side surface of the crank pulley 1 and the twisting preventing plate 12 because the forward end of the twisting preventing plate 12 is located close to the rim of the flange 2b of the crank pulley 1.

Due to the tension applied to the belt B during the wrapping, the belt B entering to the compressor pulley 6 is pulled hard to the near side of the pulley. However, the belt B guided in the space S between the twisting preventing plate 12 and the belt guide portion 15 is sandwiched and held in the belt insertion space 13 by the near-side surface of the crank pulley 1 and the twisting preventing plate 12 such that the inner circumferential surface of the belt B faces the crank pulley 1. Accordingly, a portion of the belt B which is not yet wrapped around the pulley groove 2a of the crank pulley 1 is in a state in which one side of the belt B in its width direction that is to be delivered to the near side of the outer circumferential surface of the pulley 1, 6 is closer to the rotational axis of the pulley than the other side of the belt B in its width direction that is to be delivered to the back side of the outer circumferential surface of the pulley 1, 6. Therefore, a portion of the belt B which is located on the near side of the compressor pulley 6 firmly engages with the pulley groove and flanges 6a of the pulley 6. As a result, the belt B is prevented from being detached from the pulley 6. The belt B is also prevented from being twisted with reliability on a near-side surface of the crank pulley 1 on which the belt B slides during the rotation of the crank pulley 1, and therefore prevented from being damaged on the belt back surface.

When the crank pulley 1 is further rotated, the belt B eventually moves out of the space S between the twisting preventing plate 12 and the belt guide portion 15 and rides on the top surface of the belt guide portion 15. Then, the belt B passes through the second tilted surface 15b of the belt guide portion 15, and slides into the pulley groove 2a and is completely engaged with the pulley groove 2a. As a result, the belt B is correctly wrapped around the crank pulley 1. The belt attachment jig J1 is separated from the belt B, and as shown in FIG. 9, the belt attachment jig J1 stays on the crank pulley 1 in the position between the crank pulley 1 and the compressor pulley 6 without falling from the pulley 1. The rotation of the crank pulley 1 is stopped here. After that, the belt attachment jig J1 is detached from the crank pulley 1 to finish the attachment of the belt B to the crank pulley 1.

In this manner, the belt B can be wrapped around the crank pulley 1 and the compressor pulley in a tight belt tension.

Advantages of First Embodiment

In the first embodiment, the belt B is sandwiched and held between the near-side surface of the crank pulley 1 and the twisting preventing plate 12 such that the inner circumferential surface of the belt B faces the crank pulley 1. Thus, a portion of the belt B closer to the near side of the pulley is firmly engaged with the pulley groove and the flange 6a of the compressor pulley 6, thereby making it possible to prevent the belt B from being detached from the pulley 6, and reliably prevent the belt B from being twisted and damaged on the belt back surface. In this structure, the above-mentioned belt detachment preventing jigs are not necessary. It is thus possible to reduce the number of jigs necessary for attaching the belt to the crank pulley 1, and possible to favorably attach the belt to the crank pulley 1 using the belt attachment jig J1 which is simple in structure and compact in size.

In the first embodiment, the belt B is sandwiched and fixed between the near-side surface of the crank pulley 1 and the twisting preventing plate 12, and the belt guide portion 15 is sandwiched between the fixed belt B and the pulley groove 2a. Thus, the belt attachment jig J1 can be firmly engaged with and fixed to the crank pulley 1. Accordingly, the belt attachment jig J1 does not slide on the crank pulley 1 during the attachment of the belt B. As a result, the belt B can be easily attached to the pulley 1 with reliability.

Second Embodiment of Invention

Figure 10:
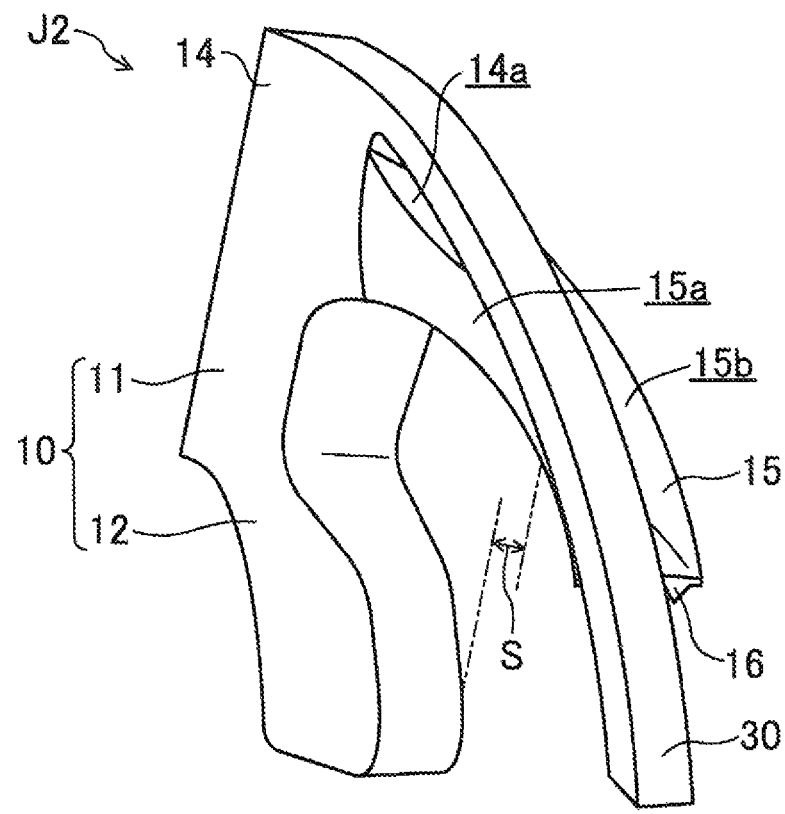
FIG. 10 is an oblique view of a belt attachment jig of the second embodiment.
Figure 11:
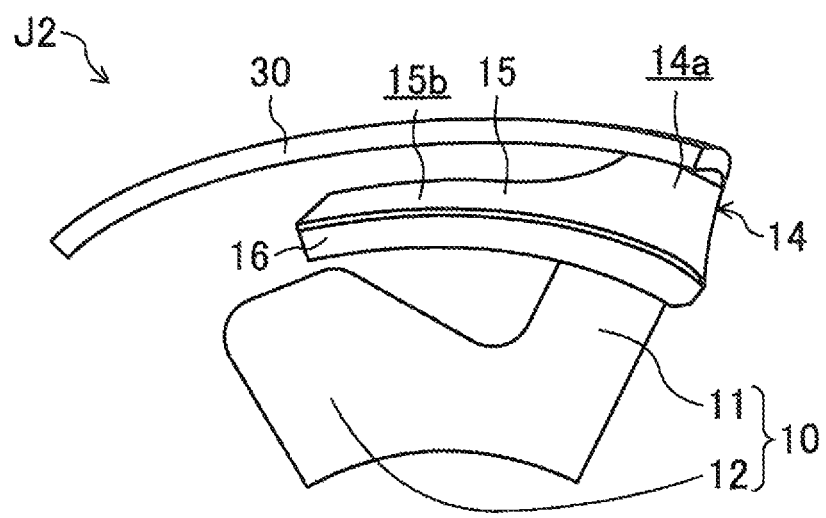
FIG. 11 is a side view of the belt attachment jig of the second embodiment.

FIG. 10 and FIG. 11 show a belt attachment jig J2 of the second embodiment. FIG. 10 is an oblique view of the belt attachment jig J2. FIG. 11 is a side view of the belt attachment jig J2.

In the present embodiment, components of the belt attachment jig J2 are similar to the components of the belt attachment jig J1 in the first embodiment, except some components of the first embodiment. Thus, only the components different from the first embodiment will be described. In the following embodiments, like reference characters have been used to designate the same components as those in FIG. 1 to FIG. 9, the explanation of which was made in the first embodiment, and a detailed explanation of such components is omitted in the present embodiment.

The belt attachment jig J2 of the present embodiment includes components similar to the components of the belt attachment jig J1 in the first embodiment, and further includes a belt pushing portion 30 which protrudes from the upper end of the belt holding portion 14 so as to be outwardly apart from the belt guide portion 15 in the radial direction of the pulley as shown in FIG. 10 and FIG. 11. The belt pushing portion 30 overlaps with the twisting preventing plate 12, with a space between each other in the radial direction of the pulley. Similar to the twisting preventing plate 12, the belt pushing portion 30 is separated from the belt guide portion 15 in the direction along the rotational axis of the pulley, with a space S between the belt pushing portion 30 and the belt guide portion 15, which is similar to the space S between the twisting preventing plate 12 and the belt guide portion 15.

The belt pushing portion 30 is, for example, an elongated plate like member which curves along the belt guide portion 15, and slightly protrudes forward from the twisting preventing plate 12 in the pulley rotational direction. Prior to the end of wrapping of the belt B, the end portion of the belt pushing portion 30 closer to the space S between the belt pushing portion 30 and the belt guide portion 15 comes in contact with a portion of the belt B which is not yet fitted in the pulley groove 2a, and pushes the portion of the belt B toward the crank pulley 1.

Figure 12:
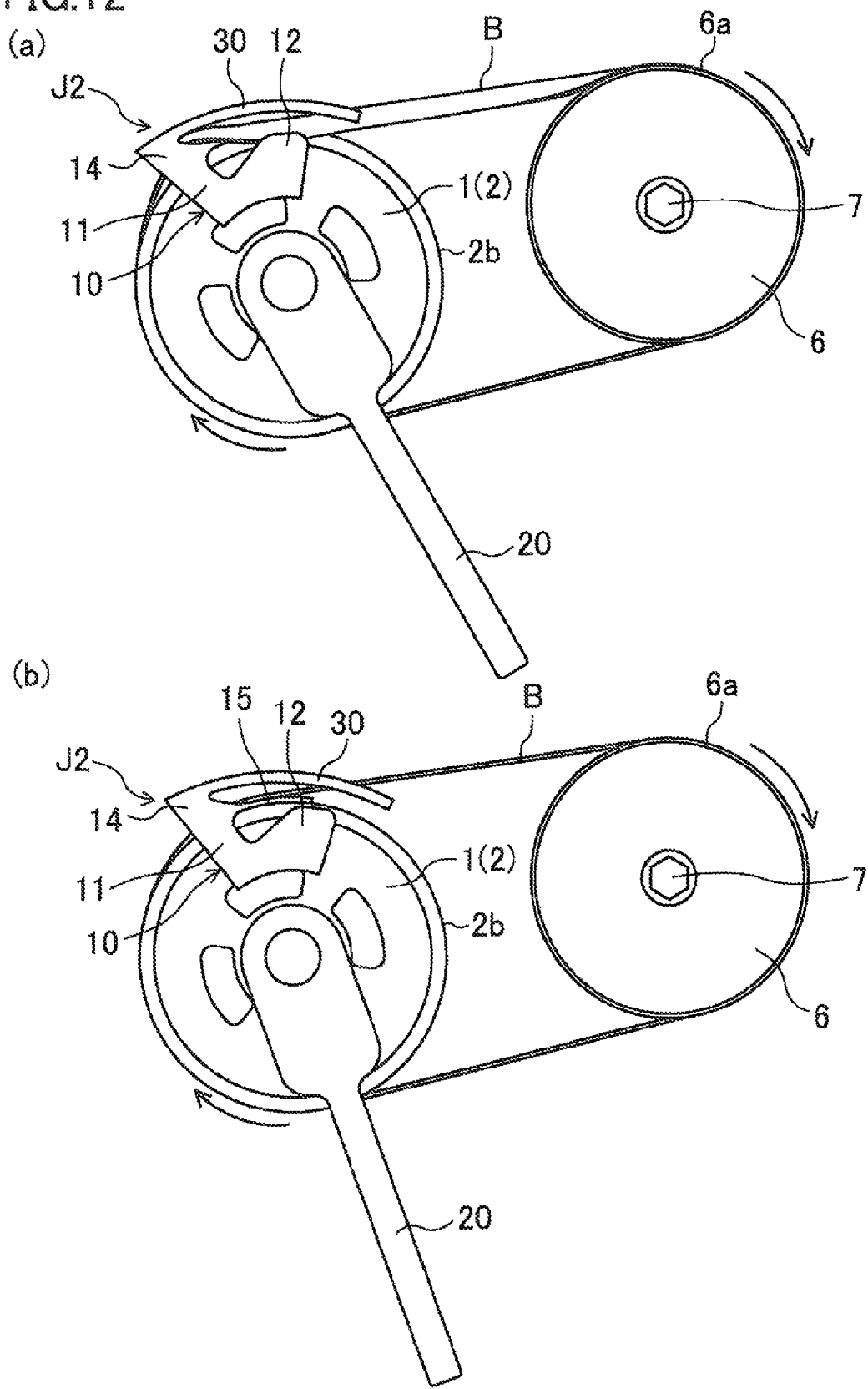
FIG. 12 is a side view showing a state near the end of the wrapping of a belt around the pulleys in the second embodiment.

FIG. 12 shows the state near the end of the wrapping of the belt B when the belt B is attached to the crank pulley 1 and the compressor pulley 6 using the belt attachment jig J2 having the above structure.

When the belt attachment jig J2 is used to attach the belt B to the crank pulley 1 and the compressor pulley 6 in the same manner as in the first embodiment, the belt B moves out of the space S between the near-side surface of the crank pulley 1 and the twisting preventing plate 12 right before the end of the wrapping of the belt B at which the belt tension is maximum. Before that, as shown in FIG. 12(a), the forward end of the belt pushing portion 30 is positioned at a portion of the belt B which is located at the near side of the pulley and is not yet wrapped around the pulley groove 2a of the crank pulley 1, and comes in contact with that portion of the belt B. When the belt B moves out of the space S between the near-side surface of the crank pulley 1 and the twisting preventing plate 12, the belt B is pushed toward the crank pulley 1 by the belt pushing portion 30, and immediately moves onto the belt guide portion 15, that is, onto the outer circumferential surface of the crank pulley 1, as shown in FIG. 12(b).

Advantages of Second Embodiment

In the second embodiment, even if the belt B moves out of the space S between the near-side surface of the crank pulley 1 and the twisting preventing plate 12 right before the end of the wrapping of the belt B around the crank pulley 1, and the portion of the belt B closer to the near side of the pulley is no longer firmly fitted to the pulley groove and the flange 6a of the compressor pulley 6, it is possible to prevent the belt B from riding on the flange 6a of the compressor pulley 6 because the portion of the belt B which is not yet fitted to the pulley groove 2a is pushed toward the crank pulley 1 by the belt pushing portion 30 prior to the end of the wrapping of the belt B.

Further, since the belt pushing portion 30 extends and curves along the rim of the crank pulley 1, the portion of the belt B which is not yet wrapped around the pulley groove 2a can be pushed toward the crank pulley 1 by the compact structure when the belt B moves out of the belt insertion space 13 between the near-side surface of the crank pulley 1 and the twisting preventing plate 12.

Third Embodiment of Invention

Figure 13:
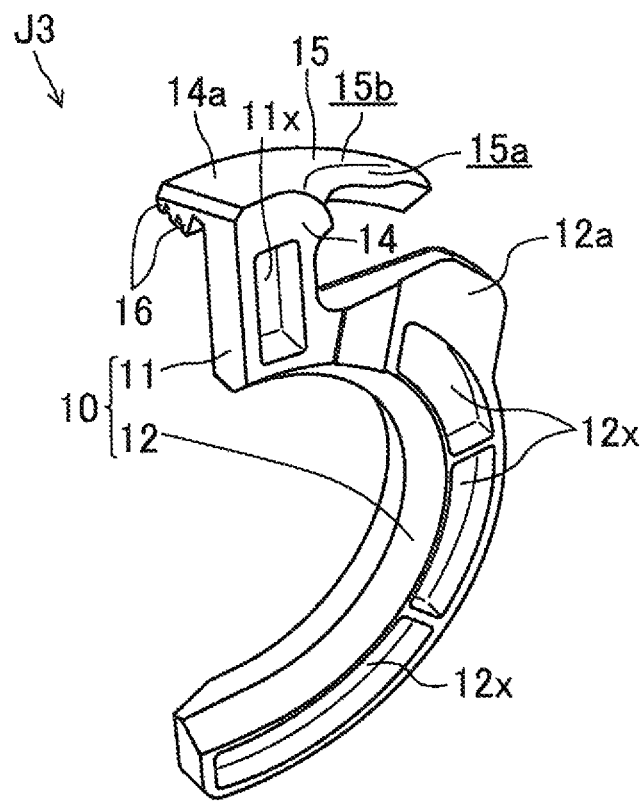
FIG. 13 is an oblique view of a belt attachment jig of the third embodiment.

FIG. 13 is an oblique view of a belt attachment jig J3 of the third embodiment.

Similar to the belt attachment jig J1 of the first embodiment, the belt attachment jig J3 of the present embodiment includes the jig body 10 comprised of the contact portion 11 and the twisting preventing plate 12, and the belt guide portion 15.

In the first embodiment, the twisting preventing plate 12 slightly protrudes forward from the belt guide portion 15 in the pulley rotational direction. However, the twisting preventing plate 12 of the present embodiment extends along the side surface of the pulley 1 like an arc following the rim of the crank pulley 1, and has a shape of an approximately half arc such that the end portion of the twisting preventing plate 12, which is an end portion opposite to the end connected to the contact portion 11, is located on the counter side of the contact portion 11 in the radial direction of the pulley. Thus, the belt attachment jig J3 is configured to be capable of holding, when attached to the crank pulley 1, a portion of the belt B extending radially outward from near a center portion of the pulley 1 at a belt-separating side of the pulley 1, by sandwiching the portion of the belt B in the belt insertion space 13 between the near-side surface of the pulley 1 and the twisting preventing plate 12, with the inner circumferential surface of the belt B facing the crank pulley 1.

The twisting preventing plate 12 is thinner at the end portion connected to the contact portion 11, and thicker at the other portion of the twisting preventing plate 12, to increase the stiffness of the portion opposite to the portion closer to the contact portion 11. Accordingly, when the belt B is inserted in the space between the near-side surface of the crank pulley 1 and the portion opposite to the portion closer to the contact portion 11, the twisting preventing plate 12 is not easily deformed locally at the portion opposite to the contact portion 11. The end portion of the twisting preventing plate 12 closer to the contact portion 11 includes a pushing protrusion 12a which protrudes radially outward of the pulley to be close to the forward end of the belt guide portion 15. Similar to the twisting preventing plate 12 of the belt attachment jig J1 of the first embodiment, the pushing protrusion 12a is located close to the rim of the flange 2b of the pulley 1 near the forward end of the belt guide portion 15, with the belt attachment jig J3 attached to the crank pulley 1.

A rectangular hole 11x is formed at a central portion of the contact portion 11 from a surface opposite to the surface facing the pulley 1. Also, a plurality of curved rectangular holes 12x (three holes in the present embodiment) following the curve of the twisting preventing plate 12 are formed at central portions of the twisting preventing plate 12 from a surface opposite to the surface facing the pulley 1, such that they are aligned with each other. Accordingly, the weight of the belt attachment jig J3 can be reduced while maintaining the stiffness necessary for the jig body 10.

Figure 14:
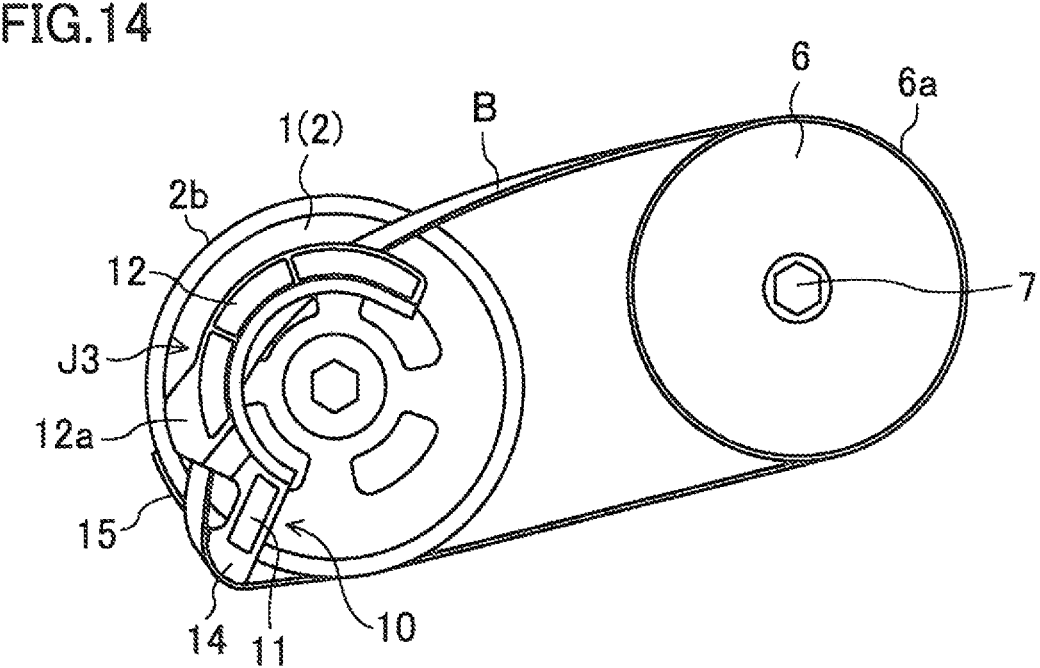
FIG. 14 is a side view showing a state in which the belt attachment jig of the third embodiment is attached to a pulley.
Figure 15:
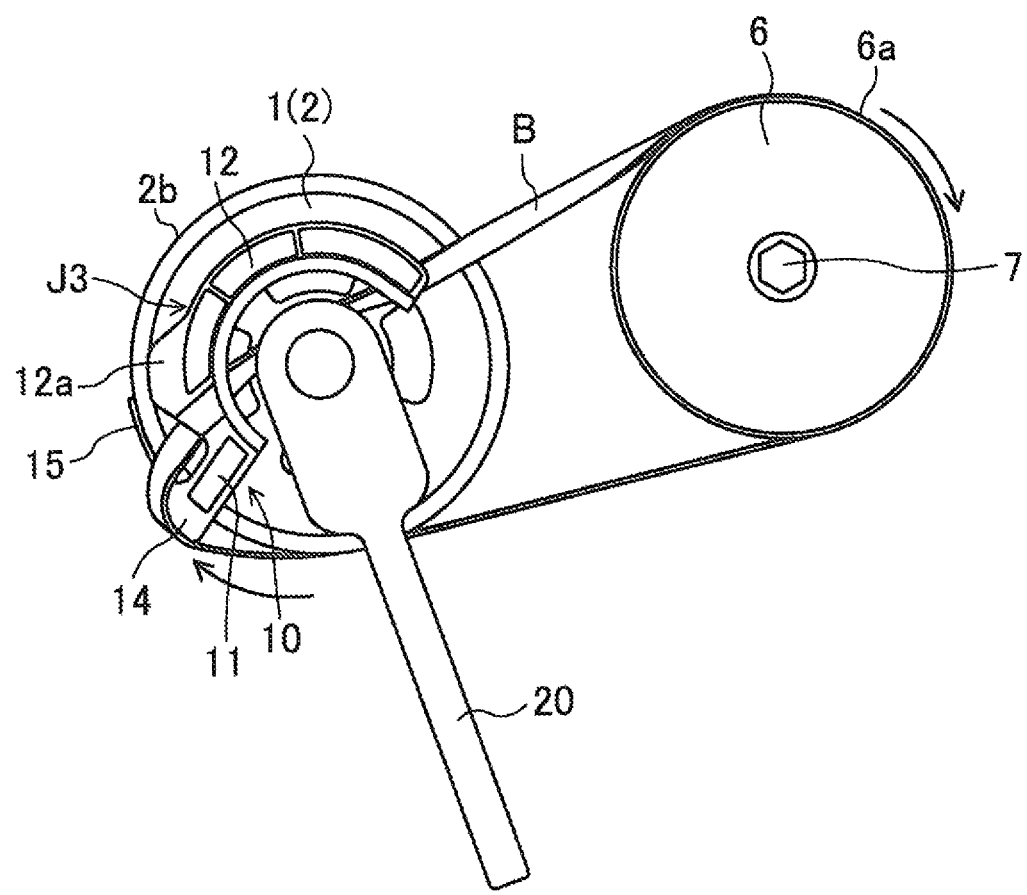
FIG. 15 is a side view showing a state in the middle of the wrapping of the belt around the pulleys in the third embodiment.
Figure 16:
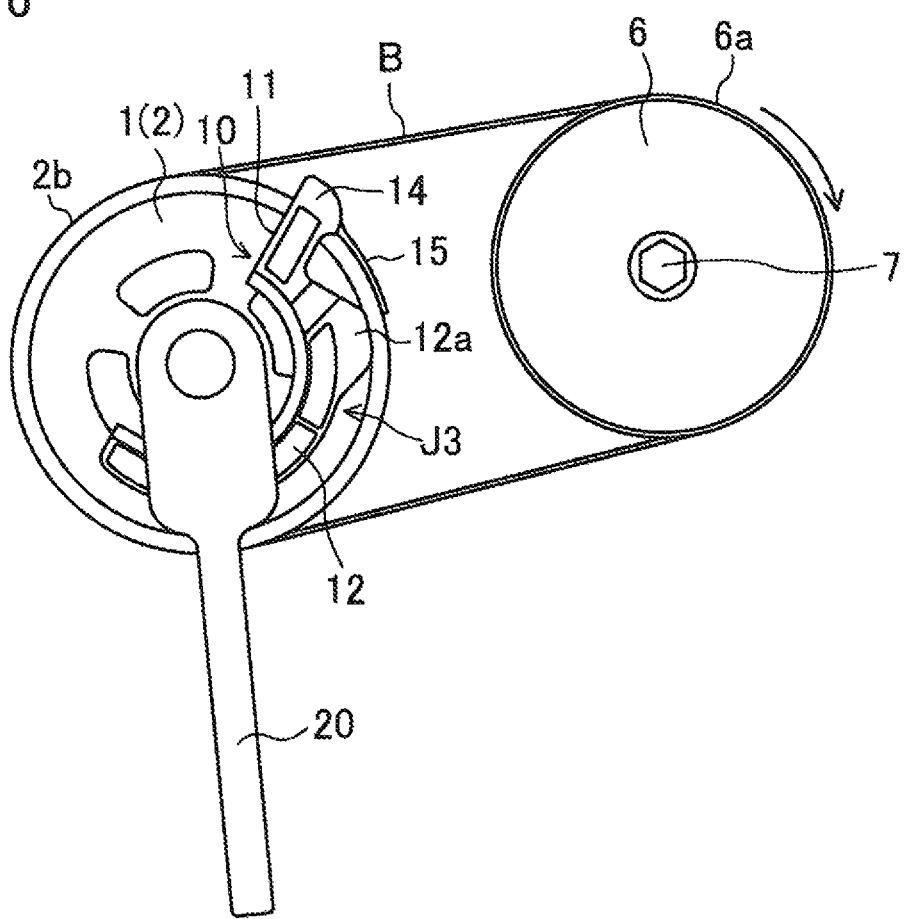
FIG. 16 is a side view showing a state in which the wrapping of the belt around the pulleys in the third embodiment is finished.

FIG. 14 to FIG. 16 show the steps for attaching the belt B to the crank pulley 1 and the compressor pulley 6 using the belt attachment jig J3 having the above structure. FIG. 14 is a side view showing a state in which the belt attachment jig J3 is attached to the crank pulley 1. FIG. 15 is a side view showing a state in the middle of the wrapping of the belt B around the crank pulley 1. FIG. 16 is a side view showing a state in which the wrapping of the belt B around the crank pulley 1 is finished.

To attach the belt B to the crank pulley 1 and the compressor pulley 6 using the belt attachment jig J3, similar to the first embodiment, one end of the belt B is looped over the compressor pulley 6 first, and the other end of the belt B is wound around the belt attachment jig J3 by inserting the belt B in the space S between the belt guide portion 15 and the twisting preventing plate 12 as shown in FIG. 14. A portion of the belt B located on the rear side of the belt holding portion 14 in the pulley rotational direction is fitted into the pulley groove 2a. A portion of the belt B which passes through the space S between the belt guide portion 15 and the twisting preventing plate 12 is sandwiched between the near-side surface of the crank pulley 1 and the twisting preventing plate 12, and held in the belt insertion space 13 such that the inner circumferential surface of the belt B faces the crank pulley 1. The belt attachment jig J3 is attached to the crank pulley 1 by winding the belt B around the belt attachment jig J3. In this structure, compared to the case in the first embodiment, a longer portion of the belt B on the side of the crank pulley 1, including the portion of the belt B extending radially outward from near a center portion of the pulley at the belt-separating side of the pulley, can be held between the near-side surface of the crank pulley 1 and the twisting preventing plate 12. Accordingly, it is possible to maintain the belt B in a predetermined stable position.

Next, as shown in FIG. 15, the crank pulley 1 is rotated clockwise as viewed in the figure, using the wrench 20. In this manner, the crank pulley 1 is moved forward in the pulley rotational direction together with the belt B wrapped around the belt attachment jig J3, gradually increasing the area of the belt B which is fitted to the pulley groove 2a. In this step, advantages similar to those in the first embodiment are obtained.

The rotation of the crank pulley 1 is stopped when the belt attachment jig J3 is separated from the belt B and positioned at a location between the crank pulley 1 and the compressor pulley 6, while still on the crank pulley 1 without falling from the pulley 1, as shown in FIG. 16. After that, the belt attachment jig J3 is detached from the crank pulley 1 to finish the attachment of the belt B to the crank pulley 1.

Advantages of Third Embodiment

The portion of the belt B extending radially outward from near a center portion of the pulley at the belt-separating side of the crank pulley 1 is easily twisted by sliding on the side surface of the pulley 1 during the rotation of the crank pulley 1. However, in the third embodiment, the belt B is maintained in a position in which the inner circumferential surface of the belt B is made to face the crank pulley 1 by the near-side surface of the pulley 1 and the twisting preventing plate 12 since after the belt attachment jig J3 is initially attached to the crank pulley 1. Accordingly, it is possible to more reliably prevent the belt B from being twisted.

Forth Embodiment of Invention

Figure 17:
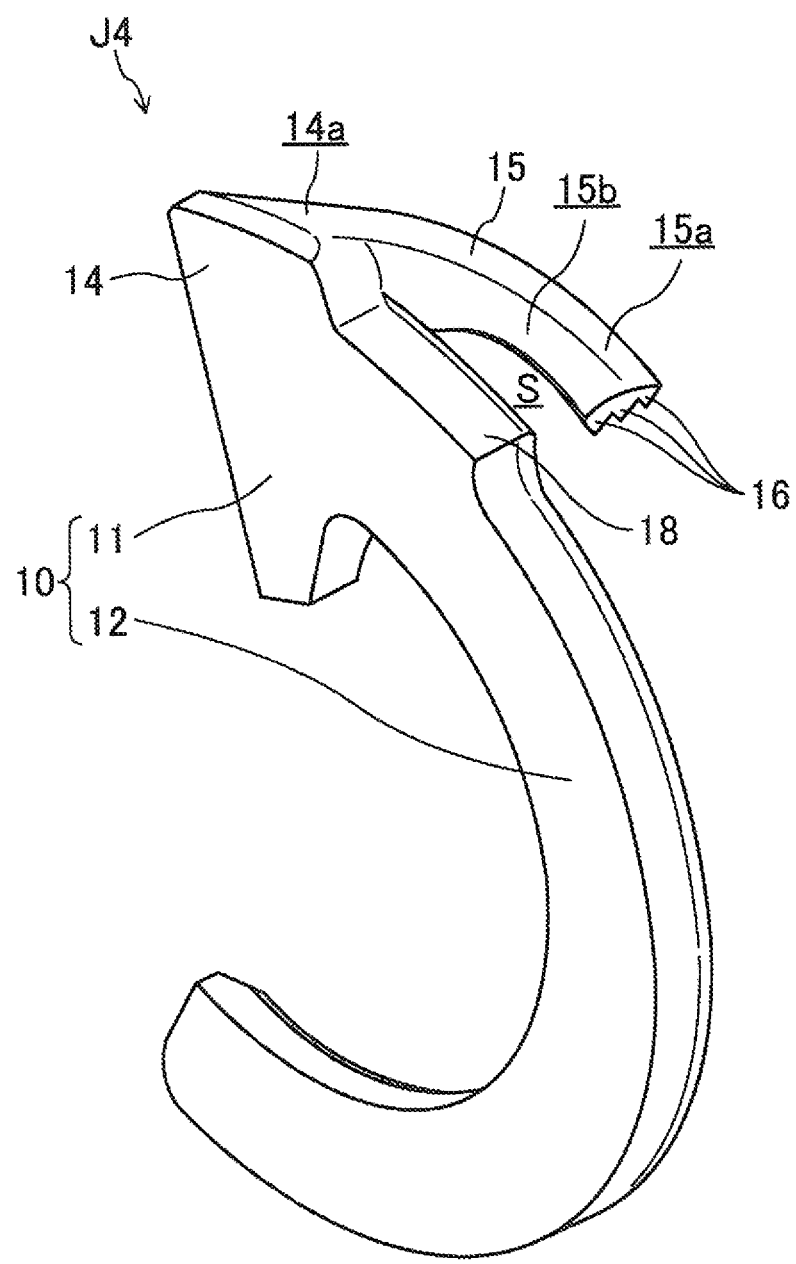
FIG. 17 is an oblique view of a belt attachment jig of the fourth embodiment.
Figure 18:
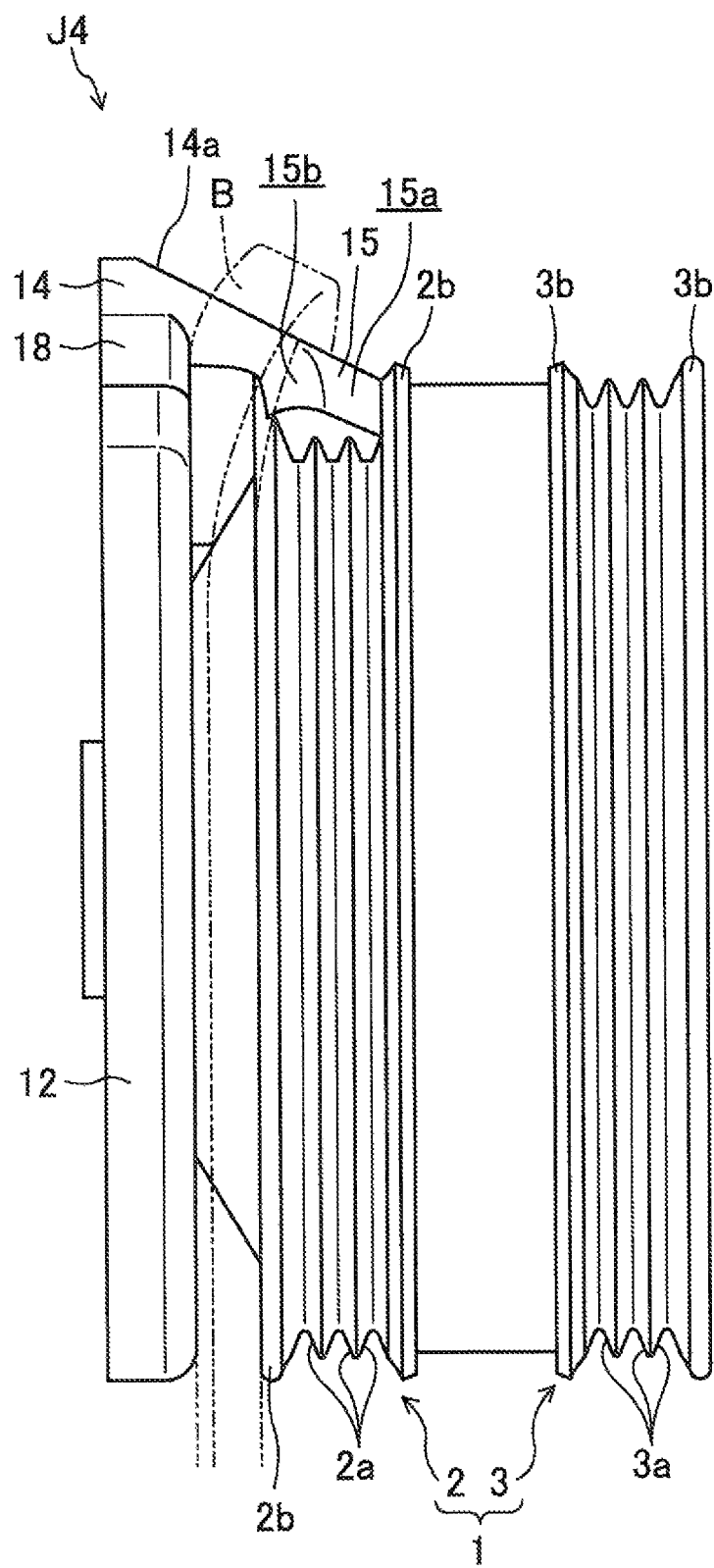
FIG. 18 is a front view showing a state in which the belt attachment jig of the fourth embodiment is attached to a pulley, and a belt is wound around the belt attachment jig.

FIG. 17 is an oblique view of a belt attachment jig J4 of the fourth embodiment. FIG. 18 is a front view showing a state in which the belt attachment jig J4 is attached to a crank pulley 1, and a belt B is wound around the belt attachment jig J4.

As shown in FIG. 17, the belt attachment jig J4 of the present embodiment includes a jig body 10 having a contact portion 11 and a twisting preventing plate 12, and a belt guide portion 15 similar to the belt guide portion 15 in the first embodiment.

The twisting preventing plate 12 of the present embodiment extends along the side surface of the pulley 1, and has a shape of an arc following the rim of the crank pulley 1. For example, the twisting preventing plate 12 has a shape of a major arc extending along more than half the circumference of the rim of the pulley 1 when the belt attachment jig J4 is attached to the crank pulley 1. Accordingly, similar to the third embodiment, the belt attachment jig J4 is configured to be capable of holding, when attached to the crank pulley 1, a portion of the belt B extending radially outward from near a center portion of the pulley 1 at a belt-separating side of the pulley 1, by sandwiching the portion of the belt B in the belt insertion space 13 between the near-side surface of the pulley 1 and the twisting preventing plate 12, with the inner circumferential surface of the belt B facing the crank pulley 1.

The jig body 10 of the present embodiment further includes a belt sandwiching portion 18 which is located at a position of the twisting preventing plate 12 closer to the contact portion 11, and protrudes radially outward of the pulley. The belt sandwiching portion 18 is separated from the belt guide portion 15 in the direction along the rotational axis of the pulley, with a space S between the belt sandwiching portion 18 and the belt guide portion 15. The space S is continuous to the belt insertion space 13. The belt B which passes through the space S is sandwiched between the belt sandwiching portion 18 and the belt guide portion 15.

To attach the belt B to the rank pulley 1 and the compressor pulley 6 using the belt attachment jig J4 having the above structure, one end of the belt B is looped over the compressor pulley 6, and as shown in FIG. 18, the other end of the belt B is made to pass through the space S between the belt guide portion 15 and the belt sandwiching portion 18 to be sandwiched between the belt guide portion 15 and the belt sandwiching portion 18, and further made to pass through the space S between the belt guide portion 15 and the twisting preventing plate 12 to have the belt B wound around the belt attachment jig J3. A portion of the belt B located on the rear side of the belt holding portion 14 in the pulley rotational direction is fitted into the pulley groove 2a. A portion of the belt B made to pass through the space S between the belt guide portion 15 and the twisting preventing plate 12 is sandwiched between the near-side surface of the crank pulley 1 and the twisting preventing plate 12 to hold the belt B in the belt insertion space 13 such that the inner circumferential surface of the belt B faces the crank pulley 1. The belt attachment jig J3 is attached to the crank pulley 1 by winding the belt B around the belt attachment jig J3. After that, the crank pulley 1 is rotated using a wrench 20 in the same manner as in the first embodiment, thereby attaching the belt B to the pulley 1.

Advantage of Fourth Embodiment

In the fourth embodiment, the belt B is sandwiched between the belt sandwiching portion 18 and the belt guide portion 15 when the belt B is wrapped around the crank pulley 1. In this structure, the belt B is fixed to the belt attachment jig J4 itself. Thus, it is possible to prevent the belt B from slipping on the belt attachment jig J4 during the rotation of the crank pulley 1, thereby making it possible to attach the belt B to the crank pulley 1 efficiently and reliably. Advantages similar to those in the first embodiment can also be obtained.

Other Embodiments

In the first to fourth embodiments, a structure in which the belt B is sandwiched in the belt insertion space 13 between the twisting preventing plate 12 and the near-side surface of the crank pulley 1 such that the inner circumferential surface of the belt B faces the crank pulley 1 is described as the belt attachment jig J1, J2, J3, J4. However, the present disclosure is not limited to this structure. The belt attachment jig J1, J2, J3, J4 may be configured such that the belt B is loosely inserted in the space between the twisting preventing plate 12 and the near-side surface of the crank pulley 1, and can thus be slightly twisted. The belt attachment jig J1, J2, J3, J4 may have any structure that can hold the belt B by the twisting preventing plate 12 and the near-side surface of the jig-attached pulley 1, at an angle at which a portion of the belt B closer to the near side of the pulley can be firmly fitted to a pulley groove and flanges 6a of a pulley 6 (to which the belt B is delivered from a jig-attached pulley 1) and that can regulate twisting of the belt B to prevent the back surface of the belt B from touching the near-side surface of the jig-attached pulley 1.

The foregoing embodiments are preferred examples, and a technical scope of the present disclosure is not limited to the scope of the above embodiments. It is understood by a person skilled in the art that the above embodiments are examples, that there may be more variations in the combination of the structural elements and the processes, and that such variations are also within the scope of the present disclosure.

For example, the belt attachment jig of the present disclosure may be configured such that the belt attachment jig J3 of the third embodiment includes the belt pushing portion 30 of the belt attachment jig J2 of the second embodiment.

In the above embodiments, an example in which the belt B is wrapped around two pulleys, i.e., the crank pulley 1 and the compressor pulley 6 is described, but of course, the belt attachment jig J of the present disclosure may also be used for wrapping the belt B around three pulleys or more.

In the above embodiments, a V-ribbed belt B is described as an example of the belt wrapped around the pulleys 1, 6. However, the belt to which the belt attachment jig J of the present disclosure is applicable is not limited to the V-ribbed belt B, but may also be a belt, such as a flat belt and a V belt, other than V-ribbed belts.

INDUSTRIAL APPLICABILITY

As described above, the present disclosure is useful as a belt attachment jig, and especially suitable as a belt attachment jig required to prevent a belt from being detached from a pulley over which the belt is looped beforehand, and prevent the belt from being damaged on the belt back surface when the belt is wrapped around at least two pulleys.

DESCRIPTION OF REFERENCE CHARACTERS

B V-ribbed belt
J1, J2, J3 belt attachment jig
S space
1 crank pulley
6 compressor pulley
2a, 3a pulley groove
2b, 3b flange
10 jig body
11 contact portion (near one end of jig body)
12 twisting preventing plate (near the other end of jig body)
12a belt pushing portion
15 belt guide portion
15a first tilted surface
15b second tilted surface
16 engagement protrusion
17 engagement groove

The invention claimed is:

1. A belt attachment jig which is used for wrapping a belt around at least two pulleys in a tight tension, by being attached to one of the pulleys, comprising:
    a belt guide portion of which a back surface is curved along its longitudinal direction;
    a jig body provided at one end of the belt guide portion in the longitudinal direction and offset on one side of the belt guide portion in a width direction of the belt guide portion orthogonal to the longitudinal direction, wherein
    the jig body includes a contact portion which is arranged on a lateral side of the belt guide portion in the width direction and which extends in a direction to which the back surface of the belt guide portion faces, and a twisting preventing plate which protrudes from the contact portion along the longitudinal direction of the belt guide portion,
    the twisting preventing plate is offset from the belt guide portion in the width direction of the belt guide portion, when viewed in a direction orthogonal to the longitudinal direction and the width direction of the belt guide portion,
    a space is formed between the twisting preventing plate and the belt guide portion in the width direction of the belt guide portion, and
    the belt is wrapped on a surface of the belt guide portion, with the back surface of the belt guide portion contacting with an outer circumferential surface of the one of the pulleys, and the belt is brought to pass the space and is sandwiched between the twisting preventing plate and one of side surfaces of the one of the pulleys in a rotational axis direction of the one of the pulleys so as to be held with an inner circumferential surface of the belt facing the one of the pulleys.

2. The belt attachment jig of claim 1, wherein
a tip portion of the twisting preventing plate is located near the belt guide portion.

3. The belt attachment jig of claim 1, wherein
the surface of the belt guide portion includes a first tilted surface tilting downward to the space at an edge closer to the space in the width direction of the belt guide portion.

4. The belt attachment jig of claim 1, wherein
the surface of the belt guide portion includes a second tilted surface tilting downward away from the space at a portion opposite to the edge closer to the space.

5. The belt attachment jig of claim 1, wherein
a width of the space becomes wider toward a tip of the twisting preventing plate.

6. The belt attachment jig of claim 1, wherein
the back surface of the belt guide portion is provided with a plurality of engagement protrusions which are wedge engaged with pulley grooves which is formed in the outer circumferential surface of the one of the pulleys and each of which has a V-shaped cross section.

7. The belt attachment jig of claim 1, wherein
an engagement groove which sandwiches and wedge engages with a flange of the one of the pulleys, the flange having a trapezoidal cross section, is formed between the back surface of the base end of the belt guide portion and the contact portion.

8. The belt attachment jig of claim 1, further comprising a belt pushing portion which protrudes from the second end of the jig body so as to be outwardly apart from the belt guide portion in a radial direction of the pulley, overlaps with the one end of the jig body with a gap between the one end of the jig body and the belt pushing portion in the radial direction of the pulley, and is separated from the belt guide portion in the direction along the rotational axis of the pulley with a space between the belt pushing portion and the belt guide portion, and in which, prior to an end of wrapping of the belt, an end portion of the belt pushing portion close to the space comes in contact with a portion of the belt which is not yet fitted in the pulley groove, and pushes the portion of the belt toward the jig-attached pulley.

9. The belt attachment jig of claim 8, wherein
the belt pushing portion curves along the rim of the jig-attached pulley.

10. The belt attachment jig of claim 1, wherein
the jig body is configured to be capable of holding, when the belt attachment jig is attached to the pulley, a portion of the belt which extends radially outward from near a center portion of the pulley at a belt-separating side of the pulley by sandwiching the belt between the jig body and the side surface of the pulley, with the inner circumferential surface of the belt facing the jig-attached pulley.

11. The belt attachment jig of claim 10, wherein
the jig body extends along the side surface of the jig-attached pulley, and has a shape of an arc following the rim of the pulley.

12. The belt attachment jig of claim 1, wherein
the jig body further includes a belt sandwiching portion which is apart from the belt guide portion in the direction along the rotational axis of the pulley, with a space between the belt sandwiching portion and the belt guide portion, and sandwiches the belt that has passed through the space between the belt sandwiching portion and the belt guide portion.

* * * * *